US008250115B2

(12) United States Patent
Bittles et al.

(10) Patent No.: US 8,250,115 B2
(45) Date of Patent: Aug. 21, 2012

(54) METHOD, APPARATUS AND SOFTWARE FOR PROCESSING DATA ENCODED AS ONE OR MORE DATA ELEMENTS IN A DATA FORMAT

(75) Inventors: William Bittles, Winchester (GB); Lucas W. Partridge, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 524 days.

(21) Appl. No.: 12/176,788

(22) Filed: Jul. 21, 2008

(65) Prior Publication Data

US 2009/0043807 A1 Feb. 12, 2009

(30) Foreign Application Priority Data

Aug. 10, 2007 (EP) ..................... 07114184

(51) Int. Cl.
*G06F 12/00* (2006.01)
(52) U.S. Cl. ....................... 707/803; 707/809
(58) Field of Classification Search .................. 707/809, 707/802, 803, 804, 755; 715/239, 242, 241, 715/249
See application file for complete search history.

(56) References Cited

U.S. PATENT DOCUMENTS

| | | | |
|---|---|---|---|
| 2006/0168511 A1* | 7/2006 | Bauer et al. | 715/513 |
| 2006/0212800 A1* | 9/2006 | Kamiya | 715/513 |
| 2006/0271843 A1* | 11/2006 | Yarde et al. | 715/513 |
| 2007/0299811 A1* | 12/2007 | Chandrasekar et al. | 707/2 |
| 2008/0082556 A1* | 4/2008 | Schneider et al. | 707/100 |
| 2010/0223211 A1* | 9/2010 | Johnson et al. | 706/11 |

FOREIGN PATENT DOCUMENTS

WO 2007065207 A1 6/2007

OTHER PUBLICATIONS

Kasdorf, B., "Indexers and XML: An Overview of the Opportunities," The Indexer [online] vol. 24, No. 2, Oct. 2004, pp. 75-78, [retrieved Oct. 21, 2008] retrieved from the Internet: <http://www.theindexer.org/files/24-2/24-2_075.pdf>.
Wong, R.K., et al., "Managing and Querying Multi-Version XML Data With Update Logging," 2002 Proc. of ACM Symposium on Document Engineering, DOCENG 2002, pp. 74-81, Nov. 8-9, 2002.
Lamb, J., "Embedded Indexing," The Indexer, [online] vol. 24, No. 4, Oct. 2005, pp. 206-209 [retrieved Oct. 21, 2008] retrieved from the Internet: <http://www.jalamb.com/>.

* cited by examiner

*Primary Examiner* — Amy Ng
(74) *Attorney, Agent, or Firm* — Patents On Demand; Brian K. Buchheit; Scott M. Garrett

(57) ABSTRACT

A method, system and a program product for processing data is disclosed. The method, system and program product disclosed herein comprises processing data encoded as one or more data elements in a data format. The data format is further processed by a parser to extract the encoded data elements. The data is encoded as multiple data elements in accordance with the first data format and saved to a file in the memory. An unique index is created to each data element indicating the locations of data elements in the file. The index is associated with the file and index is arranged to enable the extraction of data elements directly from the file in memory. The index is embedded in a art of the file and is not used by the parser for extracting the data elements from the file.

12 Claims, 5 Drawing Sheets

205

```
<?xml version="1.0" encoding="UTF-8"?>
<Part>
<Name ID = "ABC" Type = "123"/>
<Components>
<Component id ="1">
<Name>ABC</Name>
<Type>ABC</Type>
</Component>
<Component id ="2">
<Name>DEF</Name>
<Type>DEF</Type>
</Component>
</Components>
</Part>

<!-- @@index_offset_table
Xml.version,15,17
Xml.encoding,30,34
Part.Name.ID,53,55
Part.Name.Type,66,68
Part.Components.Component.id,100,100
Part.Components.Component.Name,109,111
Part.Components.Component.Type,125,127
Part.Components.Component.id,163,163
Part.Components.Component.Name,172,174
Part.Components.Component.Type,188,190
@@index_offset_table_end
-->
```

METHOD, APPARATUS AND SOFTWARE FOR PROCESSING DATA ENCODED AS ONE OR MORE DATA ELEMENTS IN A DATA FORMAT

CROSS-REFERENCE TO RELATED APPLICATION

This application claims the benefit of European Patent Application No. 07114184.0, filed 10 Aug. 2007 and which is hereby incorporated by reference.

BACKGROUND OF THE INVENTION

In data processing systems, data is commonly encoded in a data format that facilitates the storage, processing, transmission and extraction of the data. With many such data formats, the encoded data needs to be processed in order to extract or decode the data for use by a user or other data processing system. Data extraction or decoding may be performed by a parser.

An example of a system for encoding data, commonly used in computer systems, uses a mark-up language such as Extensible Mark-up Language (XML). Parsers for mark-up language such as XML are commonly provided as Application Program Interfaces (APIs) and can generally be categorized as tree based or event based APIs. Tree based parser APIs map an XML document into an internal tree structure, and then allow another application, such as a web browser, to navigate that tree and extract the required data. Event-based parser APIs report parsing events, such as the start and end of data elements, directly via callbacks to another application such as a web browser, and do not usually build an internal tree. In both cases, the web browser that receives data encoded in XML uses the parser API to decode the XML. The XML may be supplied by a web server.

One problem with the above approaches is that they require significant memory or processor resources in order to perform the data extraction or decoding.

SUMMARY OF THE INVENTION

According to a first aspect, there is provided a method for processing data encoded as one or more data elements in a data format. The data format can be arranged for further processing by a parser to extract the encoded data elements. In the method, data can be encoded as one or more data elements in accordance with a first data format. The encoded data can be saved to a file. An index of the data elements can be created, where the index indicates the locations of one or more of the elements within the file. The index can be associated with the file. The index can be arranged to enable the extraction of the data elements directly from the file in memory. The index can be embedded in a part of the file that is not used by the parser for extraction of the data elements from the file.

The data format may be a meta data language in which meta data elements are associated with the data elements in the encoded data. The data format may be a mark-up language. The data format may be XML. The index may index the meta data elements to the respective locations of the associated data elements within the file. The index may be an offset index. The index may be embedded in a comment. The index may be appended to the encoded data in the file. The location of the index within the file may be indicated by data element in the file. An index entry may be created for each occurrence of each data element.

According to another aspect, there is provided an apparatus for processing data encoded as one or more data elements in a data format. The data format can be arranged for further processing by a parser to extract the encoded data elements. The apparatus can be operable to encode data as one or more data elements in accordance with a first data format; save the encoded data to a file; and create an index of the data elements. The index can indicate the locations of one or more of the elements within the file. The apparatus can also associate the index with the file. The index can be arranged to enable the extraction of the data elements directly from the file in memory. The index can be embedded in a part of the file that is not used by the parser for extraction of the data elements from the file.

According to another aspect, there is provided a group of one or more programs arranged to enable a group of one or more programmable devices to perform a method for processing data encoded as one or more data elements in a data format. The programs can be stored in a storage medium, such as a volatile or non-volatile memory. The data format can be arranged for further processing by a parser to extract the encoded data elements. In the method, data can be encoded as one or more data elements in accordance with a first data format. The encoded data can be saved to a file. An index of the data elements can be created that indicates the locations of one or more of the elements within the file. The index can be associated with the file, where the index is arranged to enable the extraction of the data elements directly from the file in memory. The index can be embedded in a part of the file that is not used by the parser for extraction of the data elements from the file.

Another embodiment can provides a group of one or more programs arranged to enable a group of one or more programmable devices to provide apparatus for processing data encoded as one or more data elements in a data format. The data format can be arranged for further processing by a parser to extract the encoded data elements. These programs can be digitally encoded in a storage medium and can cause the apparatus to encode data as one or more data elements in accordance with a first data format; save the encoded data to a file; create an index of the data elements; associate the index with the file. The index can indicate the locations of one or more of the elements within the file. In addition, the index can be arranged to enable the extraction of the data elements directly from the file in memory. Further, the index can be embedded in a part of the file that is not used by the parser for extraction of the data elements from the file.

BRIEF DESCRIPTION OF THE SEVERAL VIEWS OF THE DRAWINGS

FIG. 5 is an example of data produced by the application programs of FIG. 2.

DETAILED DESCRIPTION OF THE INVENTION

Figure 1:
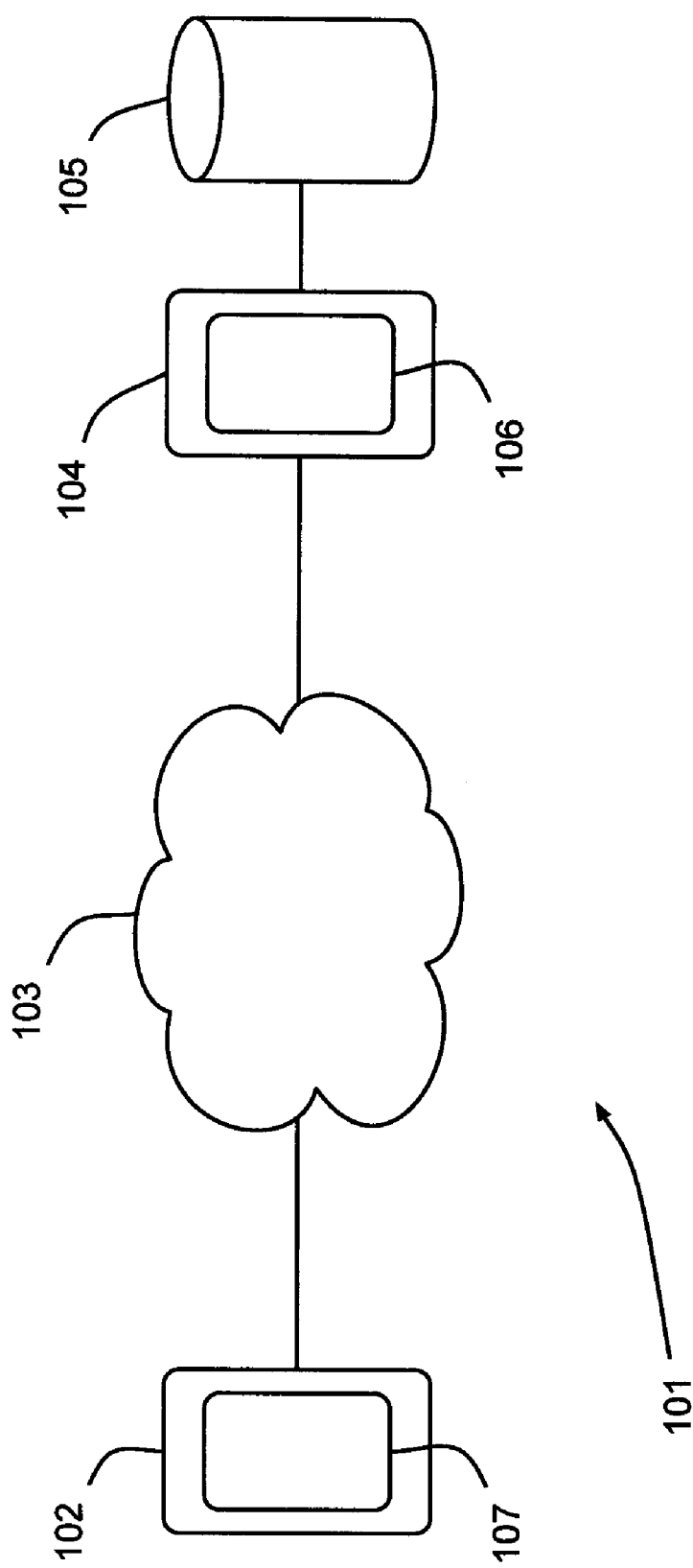
FIG. 1 is a schematic illustration of a computer system.

With reference to FIG. 1, a data processing system in the form of a computer system 101 includes a first computer 102 connected via a network 103 to a second computer 104. The second computer 104 is also connected to a database 105. The second computer 104 is provided with a database server application program 106 arranged to receive queries from the first computer 102 via a database query web page and to respond with appropriate data from the database 105. The first computer 102 is provided with a web browser client application program 107, which enables a user to view the database query web page provided by the database server application program 106.

Figure 2:
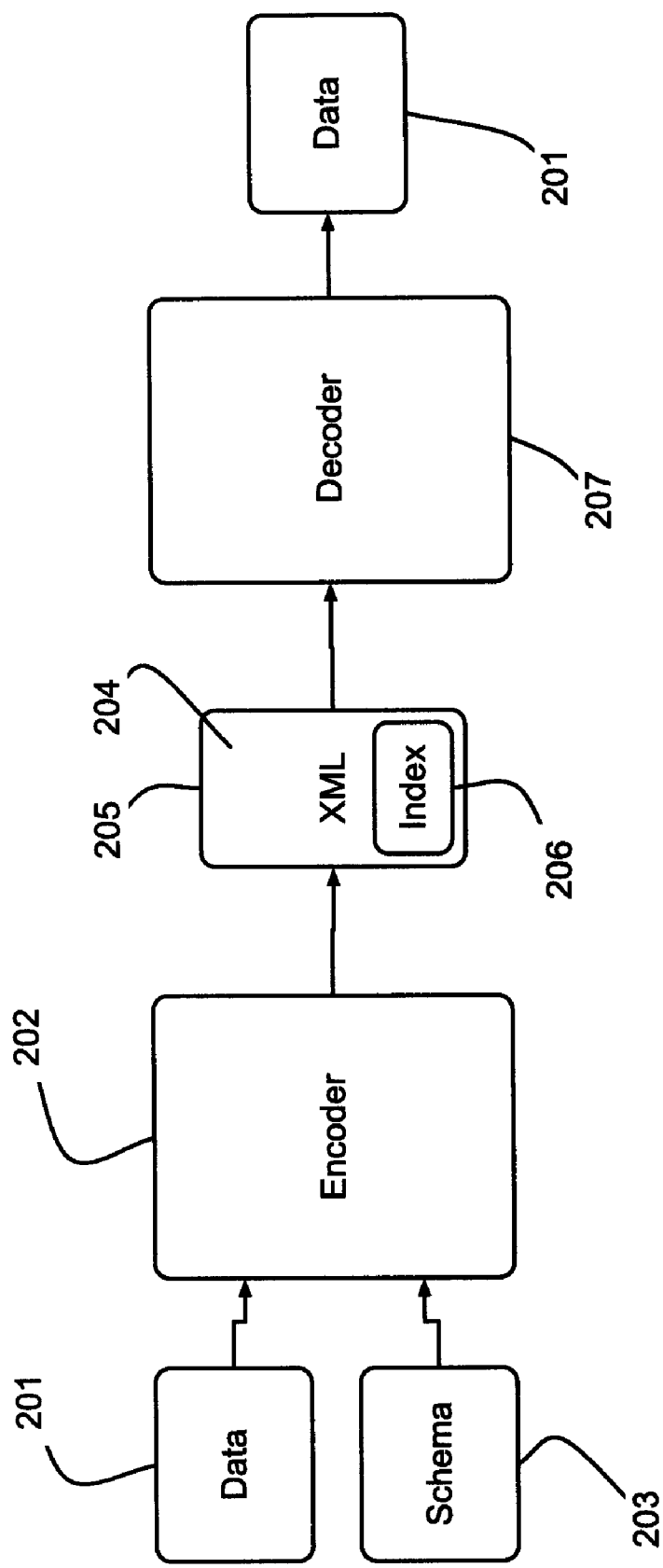
FIG. 2 is a schematic illustration of application programs performing processing in the computer system of FIG. 1.

With reference to FIG. 2, the data 201 provided by the database application program 106 is encoded as data elements in accordance with a data format in the form of a mark-up language. In the present embodiment, the mark-up language is Extensible Mark-up Language (XML). The database server application program 106 uses an XML encoding program 202 to encode data 201 that forms a response to a database query. The encoding program 202 encodes the data 201 in accordance with an XML schema 203, which defines how the data 201 is to be represented in XML. The encoding program 202 stores the encoded data 204 in a file 205. The encoding program 202 is further arranged to create an index 206 of the individual data elements in the XML encoded data 204. In the present embodiment, the index 206 indexes each of the XML tags in the encoded data 206 to their associated data elements. An example of the encoded data 204 and an associated index 206 will be described in further detail below. The web browser application program 107 on the first computer 102 uses an XML decoder 207 arranged to decode the XML encoded data 204 that comprises the database query results received from the second computer 104. The decoded data 201 is presented to the user via the web browser application program 107.

Figure 3:
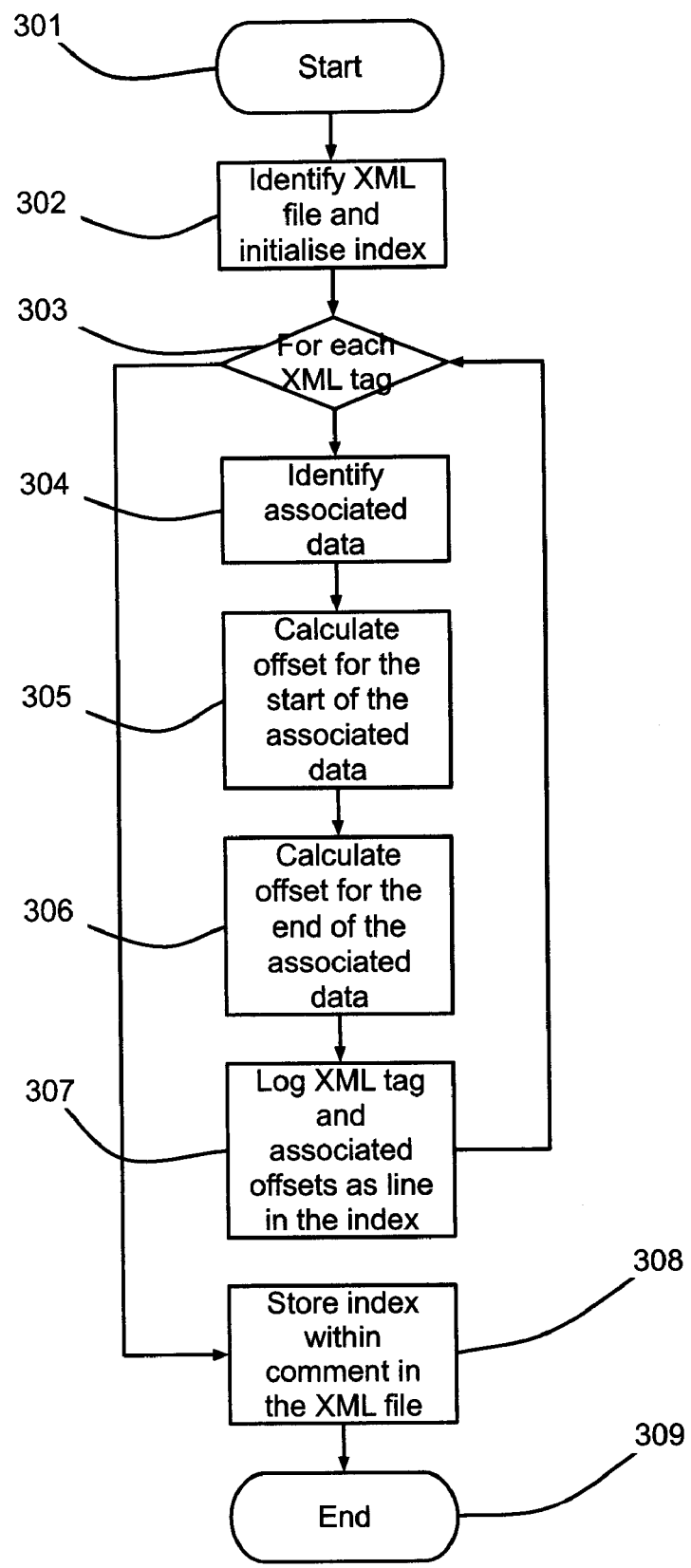
FIGS. 3 and 4 are flow charts illustrating processing performed by the application programs of FIG. 2.

The processing performed by the encoder 202 will now be described in further detail with reference to the flow chart of FIG. 3. Processing is initiated at step 301 by the database server application program 106 and processing moves to step 302. At step 302, the file 205 comprising the data 201 encoded in XML 204 is located and processing moves to step 303. At step 303, a loop condition is set to take each tag in the XML 204 in turn and perform the processing of steps 304 to 307 for each such tag. Processing first moves to step 304 where the data element associated with the given tag is identified and processing moves to step 305. At step 305, the number of characters between the start of the file 205 and the beginning of the data element is calculated. In other words, the character offset for the data element is calculated. Processing then moves to step 306 where the character offset of the end of the given data element is calculated. Processing then moves to step 307 where the XML tag and data element start and end offsets are logged in the index 206 and processing returns to step 303. The loop is performed until all of the XML tags in the XML 204 have been processed and logged in the index 206 as described above. At this point, processing moves from step 303 to step 308 where the index 206 is embedded in the file 205 by being enclosed within an XML comment and appended to the XML 204. Enclosing the index 206 within an XML comment ensures that the index 206 is carried with the XML 204 to which it applies without changing the standard manner in which XML may be processed or parsed. In other words, the index is embedded in a part of the file that is not processed by a parser when processing the XML 204 to extract the data 201.

Figure 4:
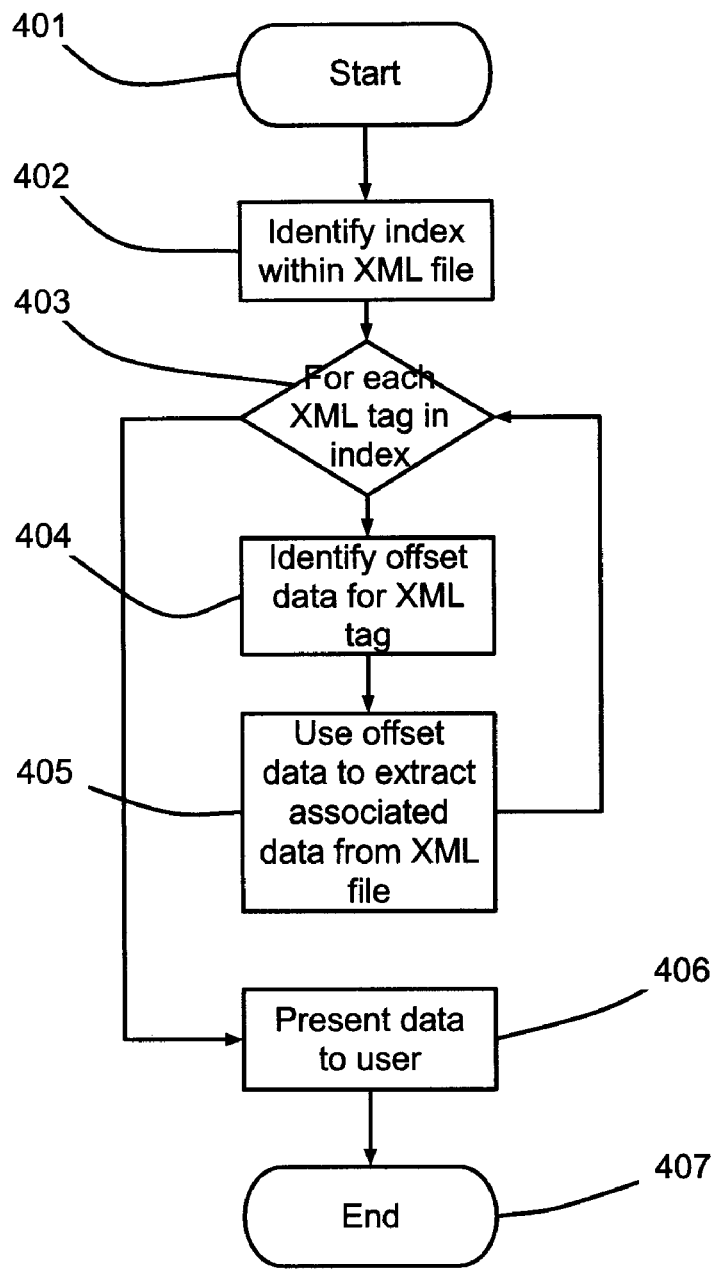

The processing performed by the decoder 207 will now be described in further detail with reference to the flow chart of FIG. 4. Processing is initiated at step 401, by the web browser application program 107 and processing moves to step 402. At step 402, the index 206 within the file 205 is identified and processing moves to step 403. At step 403, a loop condition is set up to apply steps 404 and 405 to each element in the index 206. Processing then moves through steps 404 and 405 for each entry in the index 206. At step 404, the offset data associated with the given tag is identified and processing moves to step 405. At step 405, the offset data is used to locate and extract the data element associated with the given tag within the XML encoded data 204. Once all of the entries in the index 206 have been processed as described above, processing moves from step 403 to step 406. At step 406, the extracted data 201 is presented via the web browser application program 107.

With reference to FIG. 5, an example of the contents of the file 205 comprises a section of data 201 encoded in XML 204 followed by an index 206 enclosed within an XML comment. The index 206 comprises an entry for each tag in the XML 204 indexed to offset data for the corresponding data element. The offset data comprises two numbers, the first being the character offset from the start of the file 205 to the start of the data element and the second being the character offset to the end of the data element. The comment also includes the label "@@index_offset_table" which is used by the decoder 207 for identifying the comment that comprises index 206.

As will be understood by those skilled in the art, with any data format where either the type or size of each data element is not known, the encoded data needs to be processed or parsed before the data can be used. Embodiments of the invention enable the data elements within the file to be identified and directly extracted from the file in memory by methods such as memory scanning, without the need to parse the entire encoded data file. The technique is thus applicable to any data format in which either the type or size of each data element is not known. Examples of such data formats include meta data languages and mark-up languages, for example, XML.

In another embodiment, the index is not stored within the file containing the data encoded in XML but is stored separately from the file and associated with the file by a reference within the file or by a predetermined filename or other referencing technique.

As will be understood by those skilled in the art, the index may comprise offset data defining the start and end location of each element or the start location and the length of each data element. Furthermore, the index may be embedded with a file in another non-parsed structure or a specifically provided data structure.

In a further embodiment, the index is placed at the beginning of the file. When the index is pre-pended, the index offsets need to account for the size of index, that is, the offsets need to be calculated relative to the start of the file or the end of the index. In another embodiment, the position of the index within the file is indicated by an entry at a predetermined position within the file so as to speed up the location of the index by the decoder.

In a further embodiment, the index is collated so as to provide a single entry for each element of meta data such as an XML tag. Thus, where multiple occurrences of an element are present, a single index references all such occurrences, in a similar manner to a book index. In another embodiment, the index is provided for a selected subset of all possible data elements. This would be useful, for example, when the writer of the index knows in advance that the reader is only concerned with a subset of the data elements.

In a further embodiment, a single application program is arranged to receive a file of data encoded in a given data format and to both index and decode the encoded data. In another embodiment, the index is cached in memory until the index needs to be written to non-volatile memory.

In a further embodiment, where the encoded data file has a common format with other such files, the index may be arranged for reuse. When the size of elements varies between files, padding may be provided within the common format so that a common index remains applicable. In another embodiment, when the data elements are amended, instead of generating a new index, just the entries in the index subsequent to the amended or deleted entries need have their offset position updated by the relative change in position.

It will be understood by those skilled in the art that the apparatus that embodies a part or all of the present invention may be a general purpose device having software arranged to provide a part or all of an embodiment of the invention. The device could be a single device or a group of devices and the software could be a single program or a set of programs. Furthermore, any or all of the software used to implement the invention can be communicated via any suitable transmission or storage means so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. A method for processing data encoded as one or more data elements in a data format, said data format being arranged for further processing by a parser to extract said encoded data elements, said method comprising the steps of:
   encoding data as one or more data elements in accordance with a first data format, wherein said first data format is a meta data language in which meta data elements are associated with said data elements in said encoded data;
   saving said encoded data to a file in a memory;
   creating an index of said data elements, said index indicating the locations of one or more of said data elements within said file, wherein said index is an offset index, wherein said index is embedded in a comment, wherein said index indexes said meta data elements to the respective locations of said associated data elements within said file;
   extracting said data elements from said file in said memory using said index; and
   associating said index with said file, wherein said index is embedded in a part of said file that is not used by said parser for extraction of said data elements from said file.

2. A method according to claim 1 in which said data format is a mark-up language.

3. A method according to claim 1 in which said data format is XML.

4. A method according to claim 1 in which said index is appended to said encoded data in said file.

5. A method according to claim 1 in which the location of said index within said file is indicated by data element in said file.

6. A method according to claim 1 in which an index entry is created for each occurrence of each data element.

7. A computer implemented system for processing data encoded as one or more data elements in a data format, said data format being arranged for further processing by a parser to extract said encoded data elements, said computer implemented system comprising a processor being operable to:
   encode data as one or more data elements in accordance with a first data format, wherein said first data format is a meta data language in which meta data elements are associated with said data elements in said encoded data;
   save said encoded data to a file in a memory;
   create an index of said data elements, said index indicating the locations of one or more of said data elements within said file, wherein said index is an offset index, wherein said index is embedded in a comment, wherein said index indexes said meta data elements to the respective locations of said associated data elements within said file;
   extract said data elements from said file in said memory using said index; and
   associate said index with said file, wherein said index is embedded in a part of said file that is not used by said parser for extraction of said data elements from said file.

8. A computer implemented system according to claim 7 in which said data format is XML.

9. A computer implemented system according to claim 7 in which said index is appended to said encoded data in said file.

10. A computer implemented system according to claim 7 in which the location of said index within said file is indicated by data element in said file.

11. A computer implemented system according to claim 7 in which an index entry is created for each occurrence of each data element.

12. A group of one or more programs digitally encoded in a non-transitory storage medium arranged to enable a group of one or more programmable devices to perform steps comprising:
   encoding data as one or more data elements in accordance with a first data format, wherein said first data format is a meta data language in which meta data elements are associated with said data elements in said encoded data;
   saving said encoded data to a file in memory;
   creating an index of said data elements, said index indicating the locations of one or more of said data elements within said file, wherein said index is an offset index, wherein said index is embedded in a comment, wherein said index indexes said meta data elements to the respective locations of said associated data elements within said file;
   extracting said data elements from said file in said memory using said index; and
   associating said index with said file, wherein said index is embedded in a part of said file that is not used by said parser for extraction of said data elements from said file.

* * * * *